United States Patent
Han et al.

(10) Patent No.: US 12,293,575 B2
(45) Date of Patent: May 6, 2025

(54) METHOD AND APPARATUS WITH IMAGE INFORMATION GENERATION

(71) Applicants: SAMSUNG ELECTRONICS CO., LTD., Suwon-si (KR); SNU R&DB FOUNDATION, Seoul (KR)

(72) Inventors: Bohyung Han, Seoul (KR); Jonghyeon Seon, Seoul (KR); Jaedong Hwang, Seoul (KR)

(73) Assignees: SAMSUNG ELECTRONICS CO., LTD., Suwon-si (KR); SNU R&DB FOUNDATION, Seoul (KR)

( * ) Notice: Subject to any disclaimer, the term of this patent is extended or adjusted under 35 U.S.C. 154(b) by 371 days.

(21) Appl. No.: 17/865,762

(22) Filed: Jul. 15, 2022

(65) Prior Publication Data

US 2023/0119509 A1    Apr. 20, 2023

(30) Foreign Application Priority Data

Oct. 20, 2021    (KR) ........................ 10-2021-0140405

(51) Int. Cl.
*G06V 10/82* (2022.01)
*G06V 10/774* (2022.01)
(Continued)

(52) U.S. Cl.
CPC ............ *G06V 10/82* (2022.01); *G06V 10/774* (2022.01); *G06V 10/776* (2022.01); *G06V 20/46* (2022.01)

(58) Field of Classification Search
CPC ...... G06V 10/82; G06V 20/46; G06V 10/774; G06V 10/776
See application file for complete search history.

(56) References Cited

U.S. PATENT DOCUMENTS 7,587,064 B2 * 9/2009 Owechko ............ G06V 10/426
382/103
10,102,421 B2 * 10/2018 Zhou .................... G06V 40/172
(Continued)

FOREIGN PATENT DOCUMENTS

KR    10-2019-0133548 A    12/2019
KR       10-2211106 B1       2/2021

OTHER PUBLICATIONS

Wu, Zuxuan, et al. "Adaframe: Adaptive frame selection for fast video recognition." *Proceedings of the IEEE/CVF Conference on Computer Vision and Pattern Recognition.* 2019.
(Continued)

*Primary Examiner* — Gregory M Desire
(74) *Attorney, Agent, or Firm* — NSIP Law (57) ABSTRACT

A method includes generating, by a neural network having a plurality of layers, final feature vectors of one or more frames of a plurality of frames of an input video, while sequentially processing each of the plurality of, and generating image information corresponding to the input video based on the generated final feature vectors. For each of the plurality of frames, the generating of the final feature vectors comprises determining whether to proceed with or stop a corresponding sequenced operation through layers of the neural network for generating a final feature vector of a corresponding frame, and generating the final feature vector of the corresponding frame in response to the corresponding sequenced operation completing a final stage of the corresponding sequenced operation.

17 Claims, 7 Drawing Sheets

(51) Int. Cl.
*G06V 10/776* (2022.01)
*G06V 20/40* (2022.01)

(56) References Cited

U.S. PATENT DOCUMENTS

| | | | | |
|---|---|---|---|---|
| 10,198,655 B2* | 2/2019 | Hotson | ............... | G06V 10/764 |
| 10,275,688 B2 | 4/2019 | Jiang | | |
| 10,430,661 B2* | 10/2019 | Hu | ..................... | G06N 3/044 |
| 10,452,946 B2* | 10/2019 | Hotson | ................ | G01S 7/417 |
| 10,890,898 B2* | 1/2021 | Akella | ............ | G06Q 10/063112 |
| 10,891,468 B2* | 1/2021 | Kim | ................... | G06V 10/764 |
| 11,600,039 B2* | 3/2023 | Shandilya | ............... | G06T 7/70 |
| 11,625,921 B2* | 4/2023 | Cheng | ................... | G06F 18/21 |
| | | | | 382/103 |
| 11,734,156 B2* | 8/2023 | Bansal | ................ | G06F 11/3636 |
| | | | | 717/131 |
| 11,763,564 B1* | 9/2023 | Sadoughi Nourabadi | ................... | |
| | | | | G06V 20/41 |
| | | | | 386/241 |
| 2019/0197350 A1 | 6/2019 | Park | | |
| 2019/0297326 A1* | 9/2019 | Reda | ....................... | G06T 5/20 |
| 2021/0192756 A1* | 6/2021 | Huang | ................... | G06N 3/045 |
| 2022/0044113 A1* | 2/2022 | Wu | ......................... | G06N 3/08 |

OTHER PUBLICATIONS

Wu, Zuxuan, et al. "Liteeval: A coarse-to-fine framework for resource efficient video recognition." *Advances in Neural Information Processing Systems* 32 (2019).

Meng, Yue, et al. "Ar-net: Adaptive frame resolution for efficient action recognition." *European Conference on Computer Vision*. Springer, Cham, vol. 1. 2020.

* cited by examiner

METHOD AND APPARATUS WITH IMAGE INFORMATION GENERATION

CROSS-REFERENCE TO RELATED APPLICATIONS

This application claims the benefit under 35 USC § 119(a) of Korean Patent Application No. 10-2021-0140405, filed on Oct. 20, 2021, in the Korean Intellectual Property Office, the entire disclosure of which is incorporated herein by reference for all purposes.

BACKGROUND

1. Field

The following description relates to a method and apparatus with image information generation.

2. Description of Related Art

Deep learning technologies are used in various fields, e.g., in an image processing field. Accordingly, there is interest in technology for acquiring information from images or videos using deep learning technologies.

A method of utilizing an intermediate product obtained from a layer of a network included in a deep learning model may be used to generate information from images or videos.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes generating, by a neural network having a plurality of layers, final feature vectors of one or more frames of a plurality of frames of an input video, while sequentially processing each of the plurality of, and generating image information corresponding to the input video based on the generated final feature vectors. For each of the plurality of frames, the generating of the final feature vectors comprises determining whether to proceed with or stop a corresponding sequenced operation through layers of the neural network for generating a final feature vector of a corresponding frame, and generating the final feature vector of the corresponding frame in response to the corresponding sequenced operation completing a final stage of the corresponding sequenced operation.

For each of the plurality of frames, the neural network may perform an operation for the corresponding frame based on internal states of corresponding layers in which respective feature vectors were calculated in a previous corresponding frame.

For each of the plurality of frames, the corresponding sequenced operation may include generating feature vectors of the corresponding frame for each of a plurality of stages included in the corresponding sequenced operation, using respective first neural networks of the neural network corresponding to each of the plurality of stages, and determining whether to proceed with or stop the corresponding sequenced operation using the feature vectors of each of the stages and respective second neural networks of the neural network corresponding to each of the stages.

A second neural network of the respective second neural networks, may include a neural network configured to determine whether to proceed with or stop a corresponding sequenced operation based on a feature vector generated using a first neural network of the respective first neural networks.

A second neural network of the respective second neural networks, may include a neural network configured to determine whether to proceed with or stop a corresponding sequenced operation based on a feature vector generated using a first neural network of the respective first neural networks included in a same stage as the second neural network.

One or more of the respective second neural networks may each include a normalization layer to normalize output data to an integer.

One or more of the respective first neural networks may each include either one or both of a pooling layer and a convolutional layer.

One or more of the respective second neural networks may each include any one or any combination of any two or more of a first sub-neural network configured to reflect information about a previous frame, a second sub-neural network configured to generate image information, and a third sub-neural network configured to determine whether to proceed with or stop respective sequenced operations.

The neural network may be a neural network trained based on training input video and image information corresponding to ground truth data in response to the training input video.

The neural network may be a neural network trained using on a loss function.

The loss function may include any one or any combination of any two or more of a first loss function to increase an image information inference accuracy in the training of the network, a second loss function to reduce an amount of computational operation in the training of the network, and a third loss function to increase a prediction accuracy of a second neural network in the training of the network.

The third loss function may include either one or both of a first sub-loss function to increase an image information inference accuracy of a second sub-neural network in the training of the network, and a second sub-loss function to increase a corresponding sequenced operation progress determination accuracy of a third sub-neural network in the training of the network.

The method may further include determining whether to stop the sequentially processing of the frames.

The determining of whether to stop the sequentially processing of the frames may include determining whether to stop the sequentially processing of the frames based on whether a total number of the one or more frames is greater than or equal to a threshold number of frames.

The determining of whether to stop the sequentially processing of the frames may include determining whether to stop the sequentially processing of the frames based on a determined prediction accuracy of the image information generated based on final feature vectors corresponding to the one or more frames.

The method may further include receiving the input video comprising the one or more frames.

A non-transitory computer-readable storage medium may store instructions that, when executed by one or more processors, configure the one or more processors to perform the method above.

In another general aspect, an apparatus includes a processor configured to generate, by a neural network having a plurality of layers, final feature vectors of one or more frames of a plurality of frames of an input video, while sequentially processing each of the plurality of frames, generate image information corresponding to the input video based on the generated final feature vectors, for each of the plurality of frames, determine whether to proceed with or stop a corresponding sequenced operation through layers of the neural network for generating a final feature vector of a corresponding frame, and generate the final feature vector of the corresponding frame in response to the corresponding sequenced operation completing to a final stage of the corresponding sequenced operation.

The apparatus may further include a sensor. The plurality of frames may be captured by the sensor, and the apparatus may be a smartphone.

In another general aspect, an electronic device includes a processor configured to sequentially process stages of a neural network, for generating a final feature vector for each of a plurality of frames, where each of the stages includes a first neural network; determine, for each frame, whether to proceed with a corresponding sequenced operation, where each of the stages includes a second neural network different from a corresponding first neural network of a same stage; and generate an image information based on final feature vectors generated in the sequentially processed stages.

The processor may be further configured to stop the sequential processing of the stages based on a total number of the plurality of frames being greater than or equal to a threshold number of frames.

The electronic device may further include a memory configured to store instructions, and may be further configured to execute the instructions to configure the processor to perform the sequentially processing of the stages, perform the determination, and perform the generation of the image information.

Other features and aspects will be apparent from the following detailed description, the drawings, and the claims.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms used herein including technical or scientific terms may have meanings as commonly understood by one of ordinary skill in the art to which examples based on, and after an understanding of, the disclosure of this application. It will be further understood that terms, such as those defined in commonly-used dictionaries, should be interpreted as having a meaning that is consistent with their meaning in the context of the relevant art and the disclosure of this application and will not be interpreted in an idealized or overly formal sense unless expressly so defined herein.

The examples may be implemented as, or in, various types of computing device products, such as, for example, a personal computer (PC), a laptop computer, a tablet computer, a smartphone, a television (TV), a smart home appliance, an intelligent vehicle, a kiosk, and a wearable device. Hereinafter, examples will be described in detail with reference to the accompanying drawings.

Figure 1:
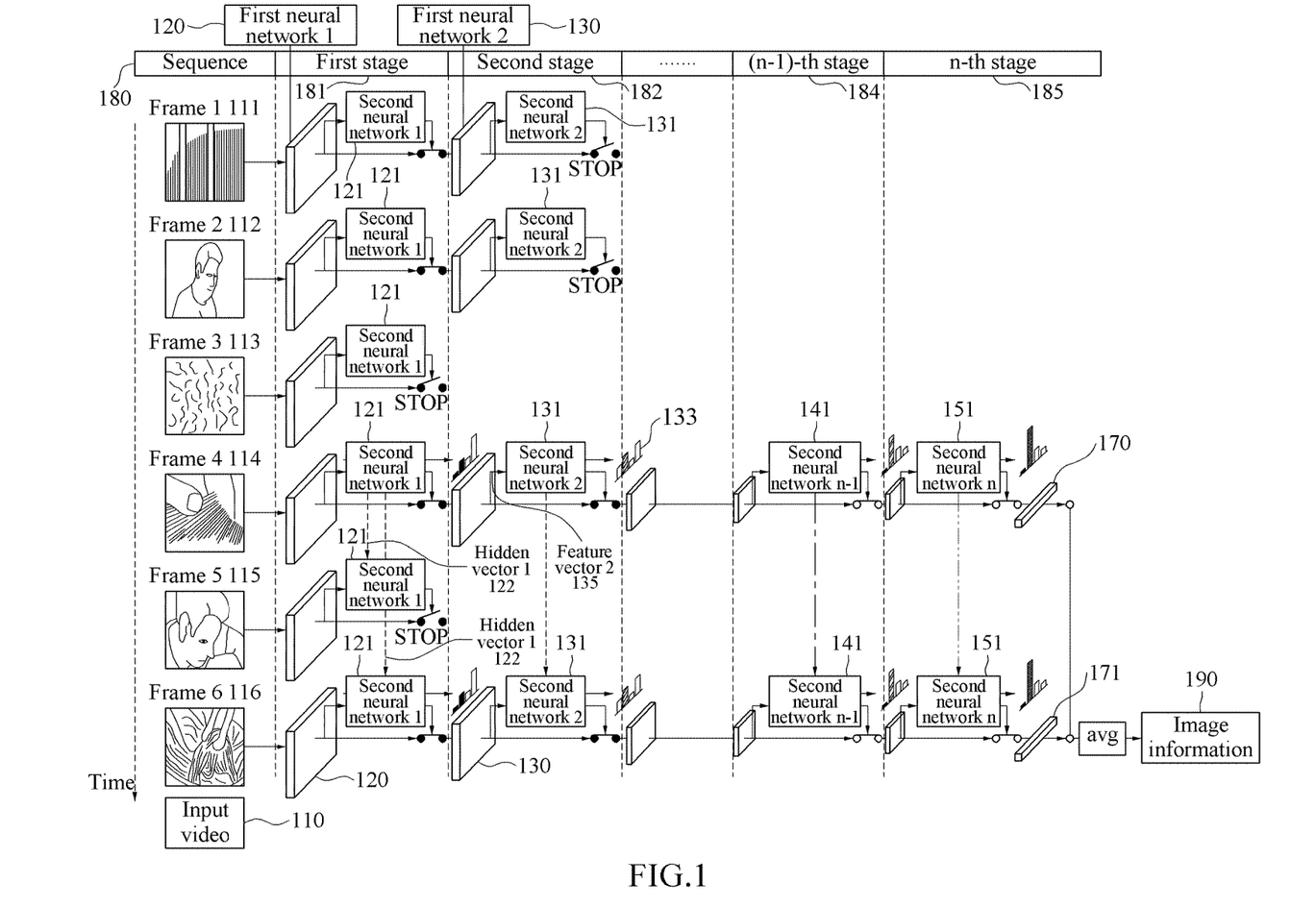
FIG. 1 illustrates an example of a method with image information generation, according to one or more embodiments.

FIG. 1 illustrates an example of a method of with image information generation, according to one or more embodiments.

FIG. 1 illustrates a plurality of captured frames 111, 112, 113, 114, 115, and 116, a plurality of stages 181, 182, 184, and 185 included in a sequence 180, a first neural network 1 120 included in a first stage 181, a second neural network 1 121 included in the first stage 181, a second neural network 2 131 included in a second stage 182, a hidden vector 1 122, a feature vector 2 135 generated using a first neural network 2 130 included in the second stage 182, image information 133 generated using the second neural network 2 131, a second neural network n-1 141 included in an (n−1)-th stage 184, a second neural network n 151 included in an n-th stage 185, a final feature vector 1 170, a final feature vector 2 171, and image information 190. While a feature vector is disclosed, this is for convenience of explanation, as the feature vector may also be a feature map, with one or more channels, herein as a non-limiting example.

Figure 7:
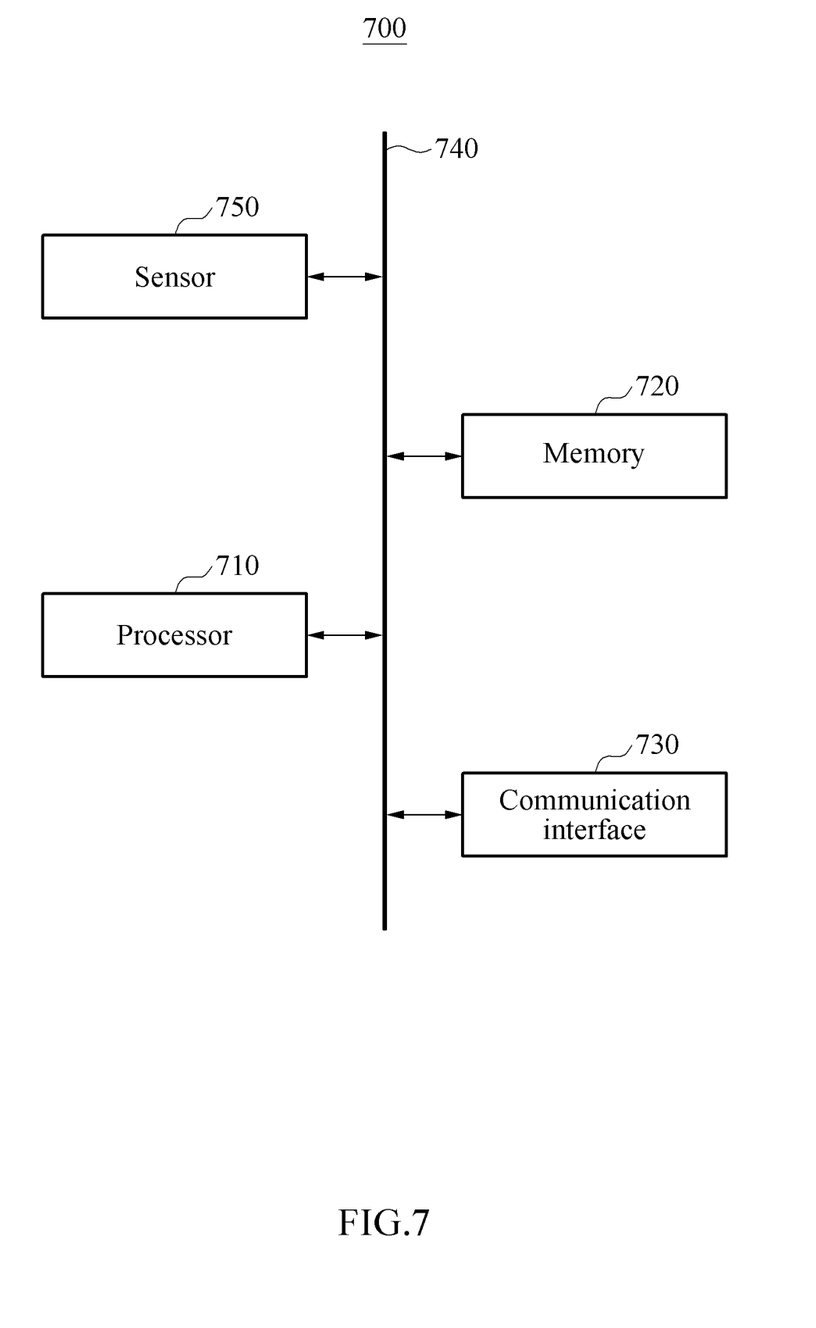
FIG. 7 illustrates an example of an electronic device, according to one or more embodiments.

A computing device, such as the electronic device 700 or the processor 710 of FIG. 7, or any other processors, as non-limiting examples, may receive an input video 110, including the plurality of frames 111, 112, 113, 114, 115, and 116. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The computing device may sequentially process the plurality of frames 111, 112, 113, 114, 115, and 116 using a neural network including a plurality of layers. As demonstrated in FIG. 1, the neural network may include a plurality of first neural networks and a plurality of second neural networks.

The computing device may generate final feature vectors of each of one or more of the plurality of frames. In an example, the computing device may generate a final feature vector 1 170 of the frame 4 114, using the neural network including the plurality of layers. In another example, the computing device may generate a final feature vector 2 171 of the frame 6 116, using the neural network including the plurality of layers.

The computing device may determine whether to proceed with or stop a sequence for generating a final feature vector of a corresponding frame using the plurality of layers, for each of the plurality of frames. For example, the computing device may obtain a feature vector of the frame 1 111, using the first neural network 1 120. The computing device may input the feature vector to the second neural network 1 121. The computing device may determine whether to proceed with or stop a sequence for generating a final feature vector of a corresponding frame, using the second neural network 1 121. The computing device may determine to proceed with the sequence using the second neural network 1 121. The computing device may input a feature vector generated using the first neural network 1 120 to the first neural network 2 130 included in a next stage. The computing device may input a feature vector obtained using the first neural network 2 130 to the second neural network 2 131. The computing device may determine whether to proceed with or stop the sequence for generating the final feature vector of the corresponding frame, using the second neural network 2 131. Here, the computing device may stop the sequence. In other words, the computing device may determine that the frame 1 111 is undesired for obtaining accurate image information. Accordingly, the computing device may not generate a final feature vector for the frame 1 111. Thus, the computing device may stop a sequence for an undesired frame, thereby reducing an amount of computational operation used to obtain image information.

If a sequence is performed up to a final stage, the computing device may generate a final feature vector of a corresponding frame. The final stage of the sequence may be, for example, the n-th stage 185. The sequence may include a plurality of stages.

The computing device may generate the final feature vector 1 170 of the frame 4 114. For the frame 4 114, the sequence may be performed up to the n-th stage 185, the final stage. The computing device may determine that the frame 4 114 is a desired frame for obtaining image information, using a neural network including a plurality of layers. The computing device may determine whether to proceed with a sequence by passing through each stage included in the sequence, using the second neural network 1 121, the second neural network 2 131, the second neural network n-1 141, and the second neural network n 151 included in each stage, for example. For example, the computing device may determine whether to proceed with the sequence from the first stage 181 to the second stage 182, using the second neural network 1 121 included in the first stage 181. The computing device may determine to proceed with the sequence to the second stage 182 by passing through the first stage 181 for the frame 4 114. By repeating the above process, the computing device may reach the n-th stage 185. The computing device may determine whether to proceed with or stop the sequence, using the second neural network n 151 included in the n-th stage 185. If the sequence is performed, the computing device may determine a feature vector obtained from a first neural network n included in the n-th stage 185 to be the final feature vector 1 170.

The computing device may generate the image information 190 corresponding to the input video 110, based on generated final feature vectors of each of one or more of frames. The computing device may generate the image information 190 corresponding to the input video 110, based on the final feature vector 1 170 and the final feature vector 2 171, which are the final feature vectors of the frames 4 114 and 6 116, respectively. For example, the computing device may obtain the image information 190 by concatenating the final feature vector 1 170 and the final feature vector 2 171. For example, the plurality of frames 111, 112, 113, 114, 115, and 116 may include image information about a process of preparing pasta. In this example, the computing device may generate the final feature vectors of the frames 4 114 and 6 116, including core content of the process of preparing pasta and generate the image information 190 based on the final feature vectors. Accordingly, the image information 190 generated by the computing device using the neural network may be associated with the process of preparing pasta.

The neural network may be configured to perform an operation for the corresponding frame based on internal states of the plurality of layers calculated in a previous frame of which a final feature vector is generated. The frame 4 114 may be, for example, a frame in which the final feature vector 1 170 is generated. A corresponding frame may be the frame 5 115. The frame 4 114 may be a previous frame preceding the frame 5 115. If the sequence is performed for the frame 5 115, the computing device may perform an operation on the frame 5 115 based on internal states of the plurality of layers calculated in the frame 4 114. In a sequence of generating the final feature vector 1 170 of the frame 4 114, the computing device may use the hidden vector 1 122 obtained using the second neural network 1 121 included in the first stage 181 to perform the operation on the frame 5 115. For example, the computing device may use the hidden vector 1 122 in the first stage 181 included in the sequence of the frame 5 115. The computing device may determine whether to proceed with or stop the sequence by inputting the hidden vector 1 122 to the second neural network 1 121. In addition, the computing device may take into consideration information about a frame of which a final feature vector is generated among previous frames in a process of performing an operation on a corresponding frame. Accordingly, the computing device may analyze a correlation between content of a previous frame including core content and the corresponding frame when generating the image information 190, and determine whether the corresponding frame is a frame that is useful in generating the image information 190.

The neural network may include, for example, a neural network trained based on training input video and training image information, e.g., input video 110 and image information 190, corresponding to ground truth data in response to the training input video. For example, training data may be data in which the training input video, including content of pasta preparation is used as input data and in which a pasta preparation image is used as ground truth data. Accordingly, the computing device may train the neural network to generate the training image information corresponding to the training input video in response to the training input video.

According to an example, the neural network may include a plurality of layers. The neural network may include a plurality of first neural networks and a plurality of second neural networks. The neural network may include a first neural network and a second neural network corresponding to each stage of a sequence. The first neural network may be, for example, a neural network to extract a feature from an image. The first neural network may include any one or any combination of at least one convolutional layer and at least one pooling layer to extract a feature from an image. An example of the second neural network will be described in detail with reference to FIG. 2 below.

According to an example, a sequence may include a plurality of stages for generating a final feature vector. The sequence may generate feature vectors of a corresponding frame for each of a plurality of stages included in the sequence, using a first neural network corresponding to each of the plurality of stages. In an example, the computing device may generate a first stage feature vector using the first neural network 1 120 included in the first stage 181. In another example, the computing device may generate a second stage feature vector using the first neural network 2 130 included in the second stage 182.

According to an example, the computing device may determine whether to proceed with or stop the sequence using the feature vectors and a second neural network corresponding to each of the stages. In an example, the computing device may determine whether to proceed with the sequence to the second stage 182 or stop the sequence at the first stage 181, using the second neural network 1 121 included in the first stage 181. In another example, the computing device may determine whether to proceed with the sequence to a third stage or stop the sequence at the second stage 182, using the second neural network 2 131 included in the second stage 182.

According to examples, a computing device may finally predict a video based on meaningful frames by concentrating an amount of computational operation on frames desired for interpreting the original meaning of the video. Accordingly, a network may determine to early remove an inappropriate frame or similar frames, and thus it is possible to construct an algorithm that exhibits more accurate performance with a minimum amount of computational operation.

According to an example, image information may include information about an illegal situation. For example, the image information may be associated with a situation in which an object is stolen or a situation in which a person was killed. A neural network may be trained on the above illegal situations. The computing device may perform an efficient operation by sequentially processing frames with a small amount of computational operation using a neural network in a general situation, and may detect an illegal situation using feature vectors extracted in all stages of a sequence if the illegal situation occurs. Thus, the examples may also be applied to an image system for surveillance purposes.

Figure 2:
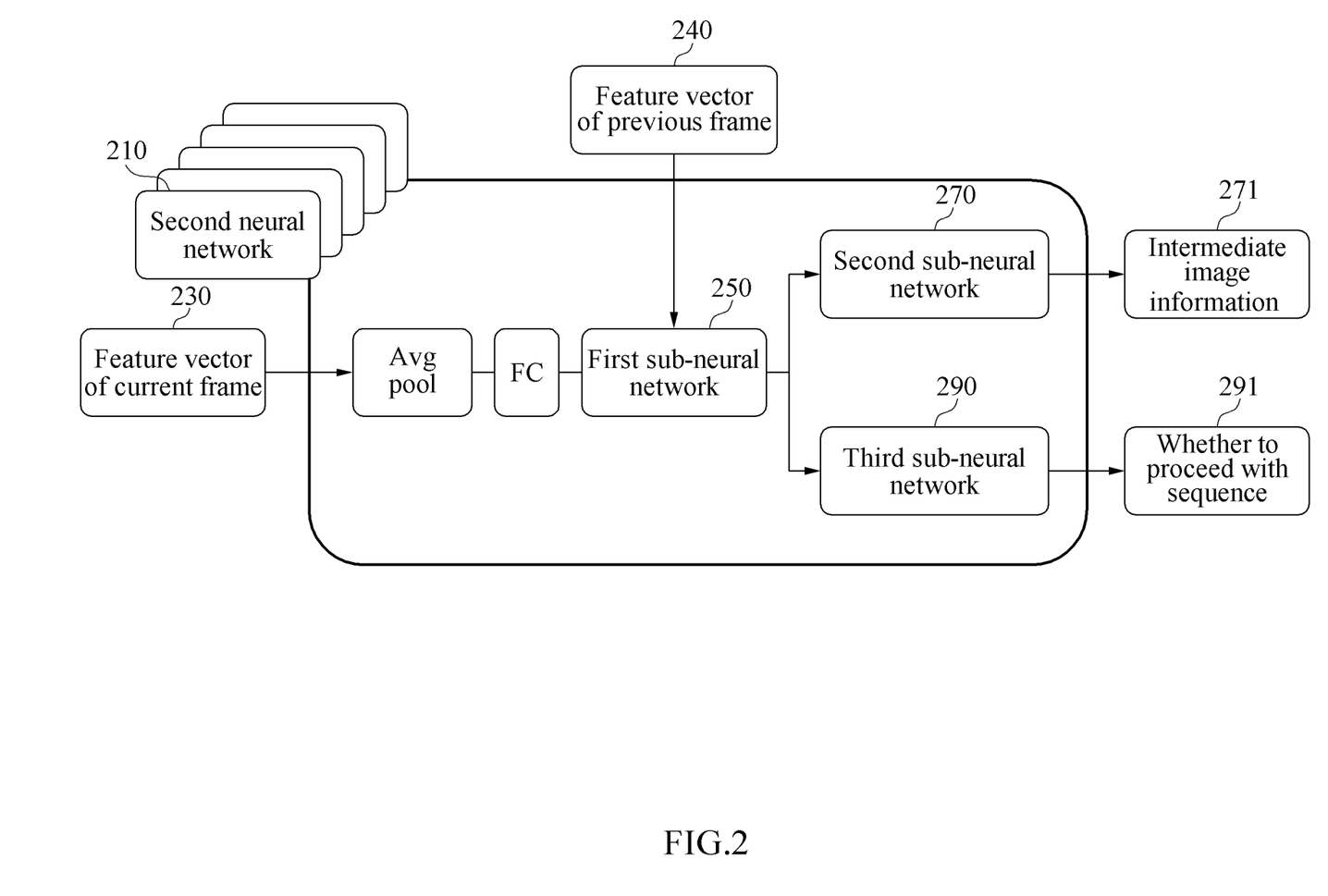
FIG. 2 illustrates an example of a second neural network, according to one or more embodiments.

FIG. 2 illustrates an example of a second neural network, according to one or more embodiments.

FIG. 2 illustrates a second neural network 210, a feature vector 230 of a current frame, a hidden vector 240 of a previous frame, a first sub-neural network 250, a second sub-neural network 270, a third sub-neural network 290, intermediate image information 271, and information 291 about whether to proceed with a sequence.

The second neural network 210 may include a neural network trained to determine whether to proceed with or stop a sequence based on a feature vector generated using a first neural network. The computing device, according to an example, may determine whether to proceed with a sequence, using the second neural network 210. In an example, if an output value obtained using the second neural network 210 is "1", the computing device may proceed with the sequence. In another example, if the output value obtained using the second neural network 210 is "0", the computing device may stop the sequence.

The second neural network 210 may include, for example, a neural network trained to determine whether to proceed with or stop a sequence based on feature vector generated using a first neural network included in the same step as that of the second neural network 210 among a plurality of stages 181, 182, 184, and 185 included in the sequence. For example, the computing device may obtain a feature vector using the first neural network 1 120 included in the first stage 181 for the frame 1 111 shown in FIG. 1. The computing device may input the feature vector to the second neural network 1 121 included in the first stage 181. The computing device may determine whether to proceed with or stop a sequence for generating a final feature vector of a corresponding frame, using the second neural network 1 121 included in the first stage 181.

The second neural network 210 may include a normalization layer to normalize output data to an integer. For example, the integer may be "0" or "1". The normalization layer may be, for example, Gumbel-Softmax. For example, the computing device may determine whether to proceed with or stop a sequence using the second neural network 210 based on a value of "0" or "1" as a result of Gumbel-Softmax.

The second neural network 210 may include the first sub-neural network 250 trained to reflect information about a previous frame, the second sub-neural network 270 trained to generate image information, and the third sub-neural network 290 trained to determine whether to proceed with or stop a sequence. As shown in FIG. 2, the computing device may acquire a plurality of pieces of output data using the second neural network 210. The computing device may acquire the intermediate image information 271 or the information 291 about whether to proceed with the sequence, using the second neural network 210. The computing device may generate the intermediate image information 271 using the second sub-neural network 270 included in the second neural network 210. The computing device may determine the information 291 about whether to proceed with the sequence, using the third sub-neural network 290 included in the second neural network 210.

The first sub-neural network 250 may be, for example, a neural network trained to reflect information about a previous frame. The first sub-neural network 250 may be, for example, a neural network trained to reflect information about a previous frame of which a final feature vector is generated. The first sub-neural network 250 may include, for example, average pooling, max pooling, self-attention, and/ or long short-term memory (LSTM). In an example, the first sub-neural network 250 may receive, as an input, the hidden vector 240. The first sub-neural network 250 may receive, as an input, the feature vector 230. In another example, the first sub-neural network 250 may also receive, as an input, data on which operations using an average pooling layer and a fully connected layer shown in FIG. 2 are performed. For example, in FIG. 1, a current frame may be the frame 6 116, and a previous frame may be the frame 4 114 of which the final feature vector 1 170 is generated. In this example, the computing device may use the hidden vector 1 122 in the first stage 181 included in the sequence of the frame 6 116. The computing device may determine whether to proceed with or stop the sequence by inputting the hidden vector 1 122 to the second neural network 1 121. For example, the computing device may input the hidden vector 1 122 to the first sub-neural network 250 included in the second neural network 210. The computing device may determine whether to proceed with the sequence based on the information 291 by inputting data obtained from the first sub-neural network 250 to the third sub-neural network 290.

The second sub-neural network 270 may include a neural network trained to generate the intermediate image information 271. The second sub-neural network 270 may obtain the intermediate image information 271 for each stage included in a sequence, and the computing device may determine whether the intermediate image information 271 obtained using the second sub-neural network 270 is the same as ground truth data by comparing the intermediate image information 271 and the ground truth data. For example, as shown in FIG. 1, the intermediate image information 271 may be the image information 133 generated by the computing device using the second neural network 2 131. In other words, the intermediate image information 271 may be image information acquired in an intermediate stage of a sequence. In a neural network training process, the computing device may train a neural network so that the intermediate image information 271 obtained using the second sub-neural network 270 is the same as the ground truth data. In other words, for each stage of the sequence, the computing device may update the neural network by examining calculated intermediate image information. Accordingly, the computing device may increase an image information prediction accuracy by finely adjusting the parameters of a first neural network and a second neural network included in each stage. The computing device may not use the second sub-neural network 270 in an image information inference process using the trained neural network. In other words, the second sub-neural network 270 may be used in the neural network training process, instead of the image information inference process.

The third sub-neural network 290 may include, for example, a neural network trained to determine whether to proceed with or stop a sequence. For example, the computing device may generate output data in a form of an integer by inputting data (e.g., a probability distribution) generated using the third sub-neural network 290 to a normalization layer (e.g., Gumbel Softmax). Accordingly, the information 291 about whether to proceed with the sequence may be indicated by an integer of "1" or "0". For example, if the information 291 is indicated by "1", the sequence may proceed, and if the information 291 is indicated by "0", the sequence may be stopped.

Figure 3:
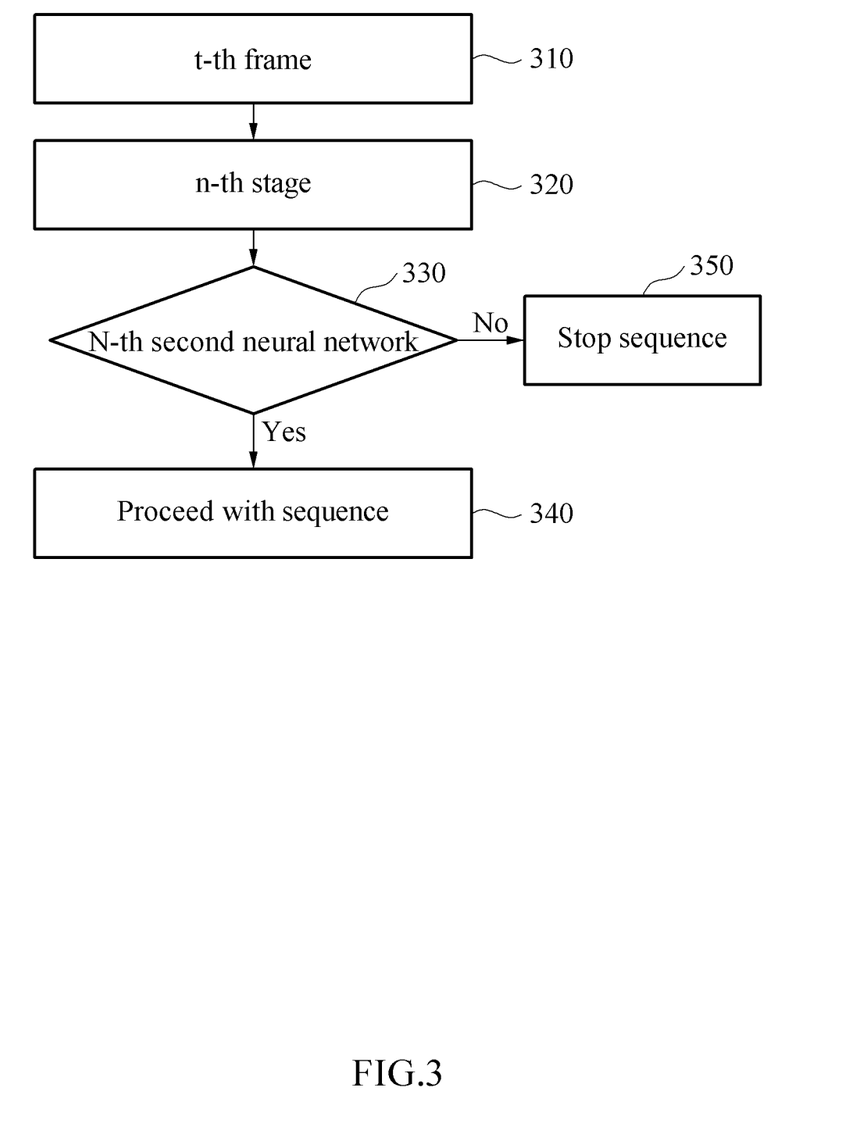
FIG. 3 is a flowchart illustrating an example of a process of determining whether to proceed with a sequence, according to one or more embodiments.

FIG. 3 is a flowchart illustrating an example of a process of determining whether to proceed with a sequence, according to one or more embodiments.

The computing device, according to an example, may receive a t-th frame 310 included in the input video 110. For example, the t-th frame 310 may be one of the plurality of frames 111, 112, 113, 114, 115, and 116 as shown in FIG. 1.

The computing device may proceed with a sequence for generating a final feature vector of the t-th frame 310. The computing device may perform an n-th stage 320 included in the sequence for the t-th frame 310. For example, the n-th stage 320 may be the second stage 182 of FIG. 1.

The computing device may determine whether to proceed with the sequence in operation 340 or stop the sequence in operation 350, using an n-th second neural network 330 included in the n-th stage 320. For example, if an n-th stage is the second stage 182 of FIG. 1, the computing device may determine whether to proceed with a sequence in operation 340 or stop the sequence in operation 350, using the second neural network 2 131 included in the second stage 182.

Figure 4:
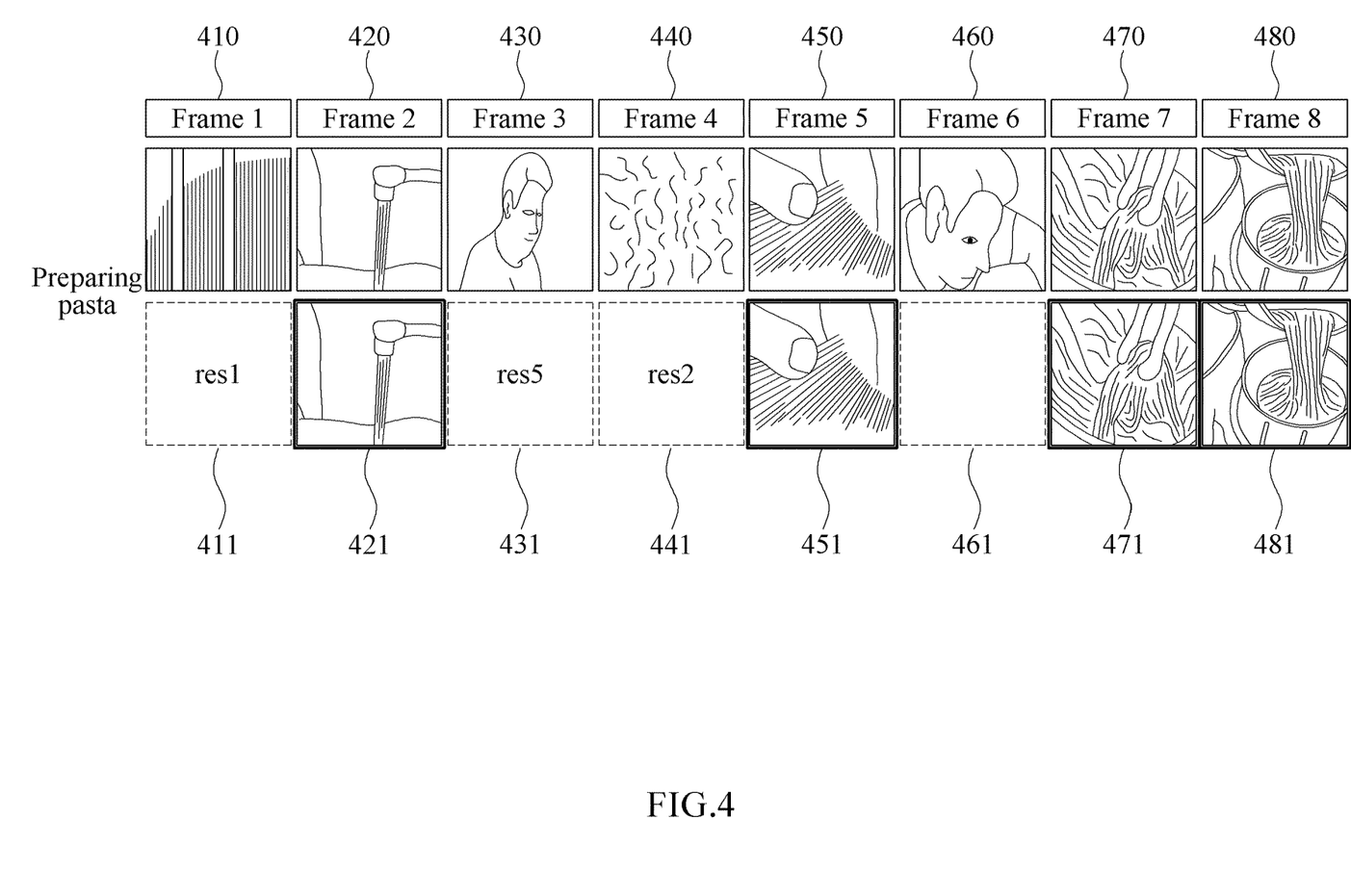
FIG. 4 illustrates an example of a method of image information generation about pasta preparation, according to one or more embodiments.

FIG. 4 illustrates an example of a method of image information generation about pasta preparation, according to one or more embodiments.

For example, the input video 110 may be a pasta preparation video, e.g., as captured by the computing device or otherwise obtained/received by the computing device. Accordingly, the image information 190 corresponding to the input video 110 may be a pasta preparation image.

The computing device may sequentially process a plurality of frames 410, 420, 430, 440, 450, 460, 470 and 480 included in the input video 110.

According to an example, a frame of which a final vector is not generated may be expressed as res #. For example, # may indicate a stage number of a sequence. If a sequence is stopped at a third stage, a processing result may be expressed as res3. The computing device may determine to stop a sequence at a first stage, for the frame 1 410. Accordingly, a processing result of the frame 1 410 may be expressed as rest 411. In another example, it may be found that a sequence of the frame 3 430 is stopped at a fifth stage, that a sequence of the frame 4 440 is stopped at a second stage, and that a sequence of the frame 6 460 is stopped at the fifth stage, as illustrated in FIG. 4.

The computing device may generate a final feature vector of frame 2 420 by performing a sequence up to a final stage. For a frame of which a final feature vector is generated, a corresponding frame 421 may also be displayed.

The frame 5 450, the frame 7 470, and the frame 8 480 may be frames of which final feature vectors are generated. Since final feature vectors of the frame 5 450, the frame 7 470, and the frame 8 480 are generated, corresponding frames 451, 471, and 481 may be displayed instead of being expressed as res #.

The computing device may generate the image information 190 based on the final feature vectors of the frame 2 420, the frame 5 450, the frame 7 470, and the frame 8 480. For example, the image information 190 may include a pasta preparation image. In other words, the computing device may accurately generate image information using feature vectors of frames that fit a main theme of the pasta preparation image.

Figure 5:
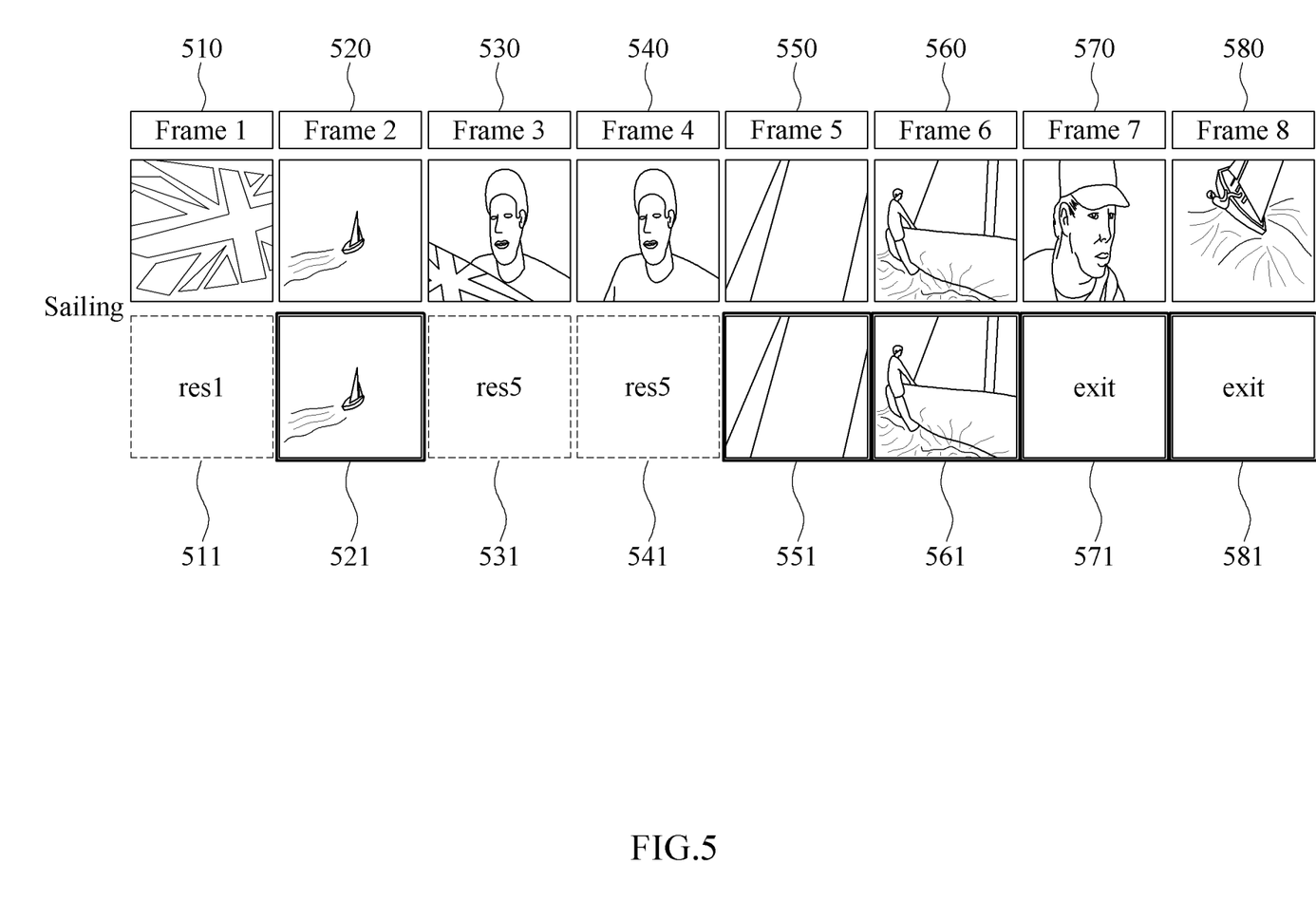
FIG. 5 illustrates an example of an early termination of a sequence, according to one or more embodiments.

FIG. 5 illustrates an example of an early termination of a sequence, according to one or more embodiments.

The computing device, according to an example, may determine whether to stop a process of sequentially processing frames. In addition, the computing device may generate image information with a high accuracy even though all frames included in the input video 110 are not processed. In this example, the computing device may stop the process of sequentially processing the frames and generate the image information. Accordingly, the computing device may obtain the image information with the high accuracy despite a small amount of computational operation.

In an example, the computing device may determine whether to stop the process of sequentially processing the frames based on whether a number of each of one or more of sequentially processed frames is greater than or equal to a threshold number of frames. In this example, the computing device may be prevented from inferring image information by processing only a relatively small number of frames. Thus, it may be possible to prevent a prediction accuracy from being reduced because the computing device prematurely infers image information. The threshold number of frames may be, for example, "5". In this example, the computing device may determine whether to stop the process of sequentially processing the frames after processing at least five frames.

In another example, the computing device may determine the process of sequentially processing the frames based on a prediction accuracy of image information generated based on final feature vectors corresponding to the frames. For example, the input video 110 may include "15" frames. The computing device may sequentially process eight frames. The computing device may generate image information based on at least one final feature vector obtained from the sequentially processed eight frames. In this example, if the prediction accuracy of the image information is greater than or equal to 90%, the computing device may stop the process of sequentially processing the frames.

For example, in a frame 7 570, the computing device may stop the process of sequentially processing the frames. The computing device may determine to stop the process of sequentially processing the frames based on the threshold number of frames and the prediction accuracy. In FIG. 5, exit 571 of the frame 7 570 and exit 581 of a frame 8 580 may represent frames that are not processed by the computing device. In other words, the process of sequentially processing the frames may be stopped, and accordingly, the computing device may not process the frame 7 570 and frame 8 580. In this example, a prediction accuracy of image information generated by the computing device based on final feature vectors of a frame 2 520, a frame 5 550, and a frame 6 560 may be 90%. The computing device may process a total of six frames from a frame 1 510 to the frame 6 560. For example, when a threshold number of frames is set to "5", a number of frames processed by the computing device may be equal to or greater than the threshold number of frames. In this example, the computing device may stop the process of sequentially processing the frames. In addition, the computing device may generate image information.

Figure 6:
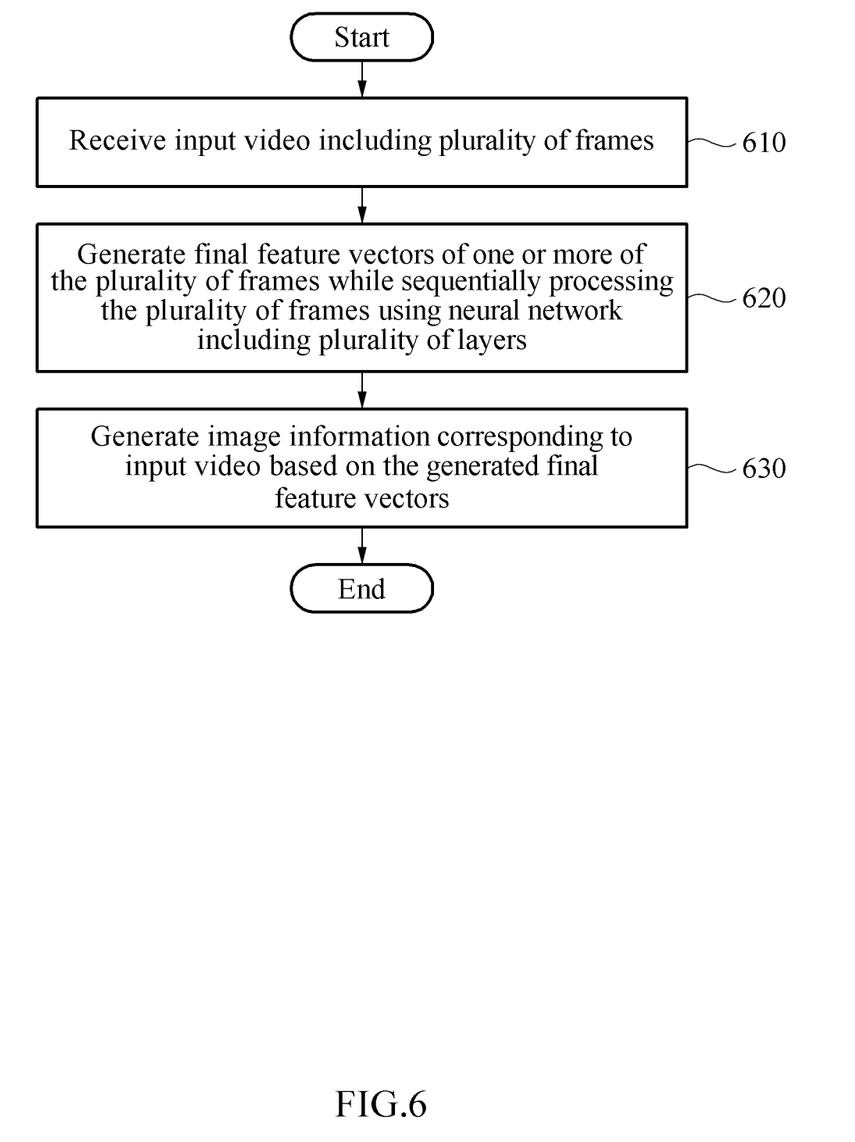
FIG. 6 is a flowchart illustrating an example of a method of with image information generation, according to one or more embodiments.

FIG. 6 is a flowchart illustrating an example of a method of with image information generation, according to one or more embodiments.

In operation 610, the computing device may receive an input video, including a plurality of frames.

In operation 620, the computing device may generate final feature vectors of each of one or more of the plurality of frames while sequentially processing the plurality of frames using a neural network including a plurality of layers.

The neural network may include, for example, a neural network trained based on a loss function. The loss function may be, for example, a function representing a difference between an actual value and a predicted value of a neural network generated through training. The computing device may train the neural network to decrease a value of the loss function in a neural network training process.

For example, the loss function may include any one or any combination of a first loss function to increase an image information inference accuracy, a second loss function to reduce an amount of computational operation, and a third loss function to increase a prediction accuracy of a second neural network.

The first loss function may be a loss function to reduce a difference between ground truth (label) image information and inference image information obtained by the computing device using the neural network. For example, the inference image information obtained by the computing device using the neural network in the neural network training process may be a "probability of being a pasta preparation image: 0.6", and the ground truth image information may be a "probability of being a pasta preparation image: 1". In this example, the computing device may update parameters included in the neural network to reduce the difference between the inference image information and the ground truth image information.

The second loss function may include, for example, a loss function to minimize an amount of computational operation used to generate the image information 190 using the neural network. For example, when the computing device proceeds with a sequence for a predetermined frame, the amount of computational operation may increase every time stages included in the sequence are performed. In this example, the computing device may use frame information and information about each of the stages in the sequence when calculating the amount of computational operation. The frame information may include, for example, a size of a frame. In addition, the information about each of the stages in the sequence may include, for example, a predicted amount of computational operation used in each of the stages. However, if a final feature vector of a predetermined frame is not generated, the computing device may early terminate a sequence for the frame, thereby reducing the amount of computational operation. Accordingly, an amount of computational operation used to generate the final feature vector for the predetermined frame may also be used when the computing device determines whether to proceed with the sequence using the second neural network. Thus, the computing device may train the second neural network to early terminate the sequence as quickly as possible for a frame with a low probability of a final feature vector being generated.

The third loss function may include, for example, a loss function to increase an accuracy of the second neural network that determines whether to proceed with or terminate a sequence. For example, the third loss function may include at least one of a first sub-loss function to increase an image information inference accuracy of the second sub-neural network 270, and a second sub-loss function to increase a sequence progress determination accuracy of the third sub-neural network 290.

The first sub-loss function may indicate a difference between prediction image information (e.g., a probability of being a pasta preparation image: 0.6) obtained by the computing device using the second sub-neural network 270 and ground truth data (e.g., a probability of being a pasta preparation image: 1). Accordingly, the computing device may determine whether the prediction image information generated using the second sub-neural network 270 included in each stage of the sequence is correct, and may update parameters of the neural network to reduce a size of the first sub-loss function in the neural network training process.

The second sub-loss function may indicate a difference between information about whether to proceed with a prediction sequence obtained by the computing device using the third sub-neural network 290 and ground truth data. For example, the information about whether to proceed with the prediction sequence obtained by the computing device using the third sub-neural network 290 may indicate "proceeding with the sequence". However, the ground truth data may indicate "stop". In this example, the computing device may update the neural network to reduce the difference between the information about whether to proceed with the prediction sequence and the ground truth data.

In operation 630, image information corresponding to the input video may be generated based on the final feature vectors generated in operation 620.

FIG. 7 illustrates an example of an electronic device, according to one or more embodiments. As a non-limiting example, the electronic device may be any one or any combinations of the computing devices discussed herein.

Referring to FIG. 7, an electronic device 700 may include the processor 710, a memory 720, a communication interface 730, and a sensor 750. The processor 710, the memory 720, and the communication interface 730 may be connected to each other via a communication bus 740. The sensor 750 may capture the plurality of frames of an input video.

The memory 720 may store a variety of information generated in the processing process of the processor 710 described above. In addition, the memory 720 may store a variety of data and programs. The memory 720 may include, for example, a volatile memory or a non-volatile memory. The memory 720 may include a high-capacity storage medium such as a hard disk to store a variety of data.

The processor 710 may be a hardware-implemented apparatus having a circuit that is physically structured to execute desired operations. For example, the desired operations may be implemented by execution of the codes or instructions stored in the memory 720. The hardware-implemented image information generation apparatus may include, but is not limited to, for example, a microprocessor, a central processing unit (CPU), graphics processing unit (GPU), a processor core, a multi-core processor, a multiprocessor, an application-specific integrated circuit (ASIC), a field-programmable gate array (FPGA), and a neural processing unit (NPU).

The processor 710 or another process of the electronic device 700 may also execute programs or other instructions and control the electronic device 700 for additional functionalities of the electronic device 700. Such program or other instructions may also be stored in the memory 720.

As a non-exhaustive example only, an electronic device 700 as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The computing devices, electronic devices, processors, processor 710, memory 720, sensor 750 and communication interface 730 in FIGS. 1-7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A processor-implemented method, comprising:
    generating, by a neural network having a plurality of layers, final feature vectors of one or more frames of a plurality of frames of an input video, while sequentially processing each of the plurality of frames; and generating image information corresponding to the input video based on the generated final feature vectors, wherein, for each of the plurality of frames, the generating of the final feature vectors comprises:

determining whether to proceed with or stop a corresponding sequenced operation through layers of the neural network for generating a final feature vector of a corresponding frame; and generating the final feature vector of the corresponding frame in response to the corresponding sequenced operation completing a final stage of the corresponding sequenced operation.

2. The method of claim 1, wherein, for each of the plurality of frames, the neural network performs an operation for the corresponding frame based on internal states of corresponding layers in which respective feature vectors were calculated in a previous corresponding frame.

3. The method of claim 1, wherein, for each of the plurality of frames, the corresponding sequenced operation comprises:

generating feature vectors of the corresponding frame for each of a plurality of stages included in the corresponding sequenced operation, using respective first neural networks of the neural network corresponding to each of the plurality of stages; and determining whether to proceed with or stop the corresponding sequenced operation using the feature vectors of each of the stages and respective second neural networks of the neural network corresponding to each of the stages.

4. The method of claim 3, wherein a second neural network, of the respective second neural networks, comprises a neural network configured to determine whether to proceed with or stop a corresponding sequenced operation based on a feature vector generated using a first neural network of the respective first neural networks.

5. The method of claim 3, wherein a second neural network, of the respective second neural networks, comprises a neural network configured to determine whether to proceed with or stop a corresponding sequenced operation based on a feature vector generated using a first neural network of the respective first neural networks included in a same stage as the second neural network.

6. The method of claim 3, wherein one or more of the respective second neural networks each comprise a normalization layer to normalize output data to an integer.

7. The method of claim 3, wherein one or more of the respective first neural networks each comprise either one or both of a pooling layer and a convolutional layer.

8. The method of claim 3, wherein one or more of the respective second neural networks each comprise any one or any combination of any two or more of a first sub-neural network configured to reflect information about a previous frame, a second sub-neural network configured to generate image information, and a third sub-neural network configured to determine whether to proceed with or stop respective sequenced operations.

9. The method of claim 1, wherein the neural network is a neural network trained based on training input video and image information corresponding to ground truth data in response to the training input video.

10. The method of claim 1, wherein the neural network is a neural network trained using on a loss function.

11. The method of claim 10, wherein the loss function comprises any one or any combination of any two or more of a first loss function to increase an image information inference accuracy in the training of the network, a second loss function to reduce an amount of computational operation in the training of the network, and a third loss function to increase a prediction accuracy of a second neural network in the training of the network.

12. The method of claim 11, wherein the third loss function comprises either one or both of a first sub-loss function to increase an image information inference accuracy of a second sub-neural network in the training of the network, and a second sub-loss function to increase a corresponding sequenced operation progress determination accuracy of a third sub-neural network in the training of the network.

13. The method of claim 1, further comprising:
determining whether to stop the sequentially processing of the frames.

14. The method of claim 13, wherein the determining of whether to stop the sequentially processing of the frames comprises determining whether to stop the sequentially processing of the frames based on whether a total number of the one or more frames is greater than or equal to a threshold number of frames.

15. The method of claim 13, wherein the determining of whether to stop the sequentially processing of the frames comprises determining whether to stop the sequentially processing of the frames based on a determined prediction accuracy of the image information generated based on final feature vectors corresponding to the one or more frames.

16. The method of claim 1, further comprising receiving the input video comprising the one or more frames.

17. A non-transitory computer-readable storage medium storing instructions that, when executed by one or more processors, configure the one or more processors to perform the method of claim 1.

* * * * *